United States Patent

Gros et al.

[11] Patent Number: 5,876,472
[45] Date of Patent: Mar. 2, 1999

[54] METHOD FOR PRODUCING A CHEMICALLY PRETENSIONED GLASS BODY

[75] Inventors: Oliver Gros, Rheinböllen; Sabine Melson, Mainz; Roland Leroux, Stadecken-Elsheim; Otmar Becker, Langen, all of Germany; Dietrich Busch, Country Durham, United Kingdom

[73] Assignee: Schott Glaswerke, Mainz, Germany

[21] Appl. No.: 957,894

[22] Filed: Oct. 27, 1997

[30] Foreign Application Priority Data

Oct. 30, 1996 [DE] Germany ............... 196 43 870.5

[51] Int. Cl.$^6$ ........................................... C03C 15/00
[52] U.S. Cl. ........................ 65/30.1; 65/30.13; 65/30.14; 65/99.2; 65/99.3; 65/99.4; 501/55; 501/65; 501/66; 501/67; 501/11; 501/53
[58] Field of Search ............... 65/30.1, 30.13, 65/30.14, 99.2, 99.3, 99.4; 501/11, 53, 55, 65, 66, 67

[56] References Cited

U.S. PATENT DOCUMENTS

| | | |
|---|---|---|
| 3,287,200 | 11/1966 | Hess et al. . |
| 3,556,757 | 1/1971 | Kozlowski et al. ........... 65/30.13 |
| 4,108,621 | 8/1978 | Asahara et al. ........... 65/30.13 |
| 4,870,034 | 9/1989 | Kiefer .................. 501/67 |
| 5,114,453 | 5/1992 | Ross et al. ............. 65/30.13 |
| 5,268,335 | 12/1993 | Kerko et al. ............ 501/67 |
| 5,599,753 | 2/1997 | Watzke et al. . |

FOREIGN PATENT DOCUMENTS

| | | |
|---|---|---|
| 753189 | 9/1970 | Belgium ................. 65/30.14 |
| 757144 | 4/1971 | Belgium ................. 65/99.4 |
| 240148 | 6/1987 | Czechoslovakia . |
| 0588000 | 3/1994 | European Pat. Off. . |
| 0638526 | 2/1995 | European Pat. Off. . |
| 1954101 | 5/1971 | Germany ............... 65/30.14 |
| 4430710 | 5/1996 | Germany . |
| 48-22970 | 7/1973 | Japan .................. 501/67 |
| 58156554 | 9/1983 | Japan . |
| 4-70262 | 9/1989 | Japan . |
| 2106891 | 4/1983 | United Kingdom ........ 501/66 |
| 2170797 | 8/1986 | United Kingdom ........ 501/66 |
| WO 96/01792 | 1/1996 | WIPO . |

OTHER PUBLICATIONS

"Festigkeitserhöung von Gläsern durch Oberflächenbehandlung" by Schröder et al, Naturwissenschaften 57, (1970), pp. 533 to 541.

*Primary Examiner*—Peter Chin
*Assistant Examiner*—Michael P. Colaianni
*Attorney, Agent, or Firm*—Walter Ottesen

[57] ABSTRACT

The invention is directed to a method of producing a chemically pretensioned glass body. In the method, a glass body is provided having a composition in percent by weight on oxide basis: $SiO_2$ 70–85; $B_2O_3$ 8–15; $Na_2O$ 1–5; $K_2O$ 1–<5; $Al_2O_3$ 1–5; $MgO$ 0–3; $SrO+BaO$ 0–2; $CaO$ 0–3; $ZnO$ 0–3; with $CaO+ZnO$ 2–6; and, $ZrO_2$ 0–3.5. The glass body is placed in an ion exchange salt bath containing at least 90% by weight of potassium salts. The salt bath is maintained at a temperature below the transformation point Tg of the glass defined by the glass composition for a duration of at least 2.0 hr causing potassium ions from the salt bath to migrate into the surface region of the glass body to thereby produce the chemically pretensioned glass body.

6 Claims, No Drawings

METHOD FOR PRODUCING A CHEMICALLY PRETENSIONED GLASS BODY

FIELD OF THE INVENTION

The invention relates to a method of producing a chemically pretensioned glass body utilizing a glass body especially in the form of a glass plate.

BACKGROUND OF THE INVENTION

The strength of glass articles can be improved in that the tensile stresses in the surface are reduced. These tensile stresses become a problem with respect to the glass. This reduction is achieved in that the glass surface is subjected to compressive stresses. This operation is often characterized as tempering. A fracture occurs only when the load has reached at least the magnitude of the compressive stresses.

In addition to thermal tempering (that is, quenching of glass articles) different methods of chemical tempering are known. They are based on ion exchange processes. Methods are known which are carried out above the transformation point Tg of the particular glass as well as methods which provide for working below the transformation point Tg. The first-mentioned methods have the disadvantage that a deformation of the glass article can occur above the transformation point Tg.

Compressive stresses can be generated below the transformation point Tg in practically rigid glass networks utilizing an ion exchange. To achieve this, existing ions having a small diameter must be replaced at the surface with ions having a larger diameter.

Alkali ions are suitable for this exchange because of their good mobility. For example, and for a soda-lime glass in a potassium salt bath, $Na^+$ ions migrate out of the glass into the salt bath and $K^+$ ions migrate from the bath into the glass. This is then a diffusion process. A diffusing ion overcomes a potential barrier proportional to the charge. For this reason, and as set forth in the article of Schroder et al entitled "Festigkeitserhöhung von Gläsern durch Oberflächenbehandlung", Naturwissenschaften, 57, pages 533 to 541 (1970), it is not to be expected that ions having a dipositive charge and a radius, which is small relative to the alkalis, are capable of migration at the moderately high temperatures (which are adequate for the diffusion of alkali ions and which temperatures are required for chemical tempering based on the described significance of the transformation point Tg for these methods). Therefore, the technical and patent literature focusses on methods for exchanging alkali ions ($Li^+$, $Na^+$) from the glass out or alkali ions ($Na^+$, $K^+$) or other univalent ions ($Ag^+$, $Au^+$) into the glass.

A glass suitable for chemical pretensioning requires a sufficient content of ions capable of exchange in accordance with accepted teaching, that is, a sufficient content of alkali ions.

The temperature difference stability of glass articles, which is required for many applications, is now improved, contrary to accepted teaching, by the reduction of the alkali content in the glass. The temperature difference stability characterizes the capability of, for example, a glass plate to withstand the temperature difference between the hot center and the cold edge of the plate. A well known example is the group of borosilicate glasses which exhibit an excellent temperature change stability and temperature difference strength because of their low thermal coefficient of expansion $\alpha$.

Accordingly, borosilicate glasses have been viewed for decades as not being chemically temperable and this view has been strengthened by unsuccessful experiments of chemical pretensioning of one of the best known examples of borosilicate glasses, namely, borosilicate glass 3.3 (composition in percent by weight on oxide basis of: $SiO_2$ 80.9; $B_2O_3$ 12.8; $Al_2O_3$ 2.4; $Na_2O$ 3.3; $K_2O$ 0.6). In this connection, reference can again be made to the above-mentioned article of Schroder et al.

In PCT patent publication WO 96/01792, a method is described directed to multiple thermal or chemical pretensioning. This method is supposedly also suitable for borosilicate glasses; however, there is no suggestion in the entire publication as to how borosilicate glasses should be chemically pretensioned, that is, specifically which composition such borosilicate glasses should have and under what method conditions and with what results. It is only simply asserted that all glasses having a thermal coefficient of expansion $\alpha$ between $3.0 \times 10^{-6}$ $K^{-1}$ and $9.5 \times 10^{31\ 6}$ $K^{-1}$ and a modulus of elasticity E of between $6.0 \times 10^4$ $N/mm^2$ and $9.0 \times 10^4$ $N/mm^2$ are suitable (without a solution of this aspect and without a teaching as to how to proceed experimentally). All embodiments relate to the thermal pretensioning of soda-lime glass plates.

The invention described in U.S. Pat. No. 5,599,753 has the object, inter alia, to provide a borosilicate glass which can be chemically tempered. It is presented that glasses, which have no lithium ion content, are therefore not suitable for chemical tempering below the transformation point Tg.

$Li_2O$ is presented as an optional component of the borosilicate glasses weak in boric acid; however, it is a necessary constituent in the preferred embodiments and, from the disclosure, it can be seen that $Li_2O$ is regarded as decisive for a glass which can be hardened below the transformation temperature Tg.

Lithium oxide has, as all other alkali oxides, the disadvantage in glass that it increases the thermal expansion and reduces the chemical resistance. Furthermore, $Li_2O$ reduces the viscosity thereby increasing the separation tendency and the nucleation tendency of the glass whereby turbidity can occur.

Japanese patent publication 4-70262 discloses that borosilicate glasses, which have a very high component for these glasses of alkali oxides (10 to 32 percent by weight $R_2O$), can be chemically pretensioned. However, these glasses exhibit a high thermal expansion because of this high alkali content.

SUMMARY OF THE INVENTION

It is an object of the invention to provide a glass which has a low thermal expansion and therefore has a high stability with respect to temperature difference and which can be chemically pretensioned and, after pretensioning, exhibits a high bending tensile strength.

The method of the invention is for producing a chemically pretensioned glass body. The method includes the steps of: providing a glass body having a composition in percent by weight on oxide basis: $SiO_2$ 70–85; $B_2O_3$ 8–15; $Na_2O$ 1–5; $K_2O$ 1–<5; $Al_2O_3$ 1–5; MgO 0–3; SrO+BaO 0–2; CaO 0–3; ZnO 0–3; with CaO+ZnO 2–6; $ZrO_2$ 0–3.5; placing the glass body in ion exchange salt bath containing at least 90% by weight of potassium salts; and, maintaining the salt bath at a temperature below the transformation point Tg of the glass defined by the above glass composition for a duration of at least 2.0 hr causing potassium ions from the salt bath to migrate into the surface region of the glass body to thereby produce the chemically pretensioned glass body. The glass body composition includes a glass refining agent in an amount corresponding to at least 0.05% by weight on oxide basis. The glass refining agent is selected from the group consisting of $Sb_2O_3$, $As_2O_3$ and a halogenide (fluoride or chloride).

Glasses of the composition set forth above contain no $Li_2O$ and only small amounts of $Na_2O$. The glasses exhibit a low thermal expansion and a low specific thermal stress which is characterized by an especially high temperature difference stability. Glass bodies of this composition can be thermally pretensioned and, surprisingly, and contrary to present day teaching, can be chemically pretensioned in conventional ion exchange processes below the transformation point Tg.

The glass bodies were left in salt baths (preferably in baths which comprise 100 percent by weight to at least 90 percent by weight of potassium salts) at bath temperatures between 400° C. and 550° C. (preferably between 450° C. and 520° C., especially at most 500° C.) for 2 to 25 hours (preferably 5 to 10 hours and especially for at least 6 hours). With such treatment, ionic exchange depths of between 10 $\mu$m to 40 $\mu$m were obtained for a surface concentration of the potassium oxide of 4 to 8 percent by weight. Lower temperatures require higher residence times. For the potassium salt bath, all conventional potassium salts can be used whose anions are stable in the given temperature range. Preferably, $KNO_3$ is used. The salt baths (as a rule starting with 100% potassium salt) are renewed when, because of the exchange of the potassium ion content, a drop has taken place so far that the desired exchange depth is no longer obtainable. This is the case, as a rule, at less than 90% by weight of potassium salt. Preferably, the bath is already renewed when the potassium salt content drops below 97% by weight because, with a dropping $K^+$ content, the necessary ion exchange time increases.

It is unexpected that glass bodies of the above-mentioned composition can be successfully chemically pretensioned below the transformation point Tg. The glasses contain no lithium ions and only few sodium ions (1 to 5% by weight $Na_2O$). In this way, the glasses contain, in part, fewer sodium ions than the already mentioned borosilicate glass 3.3 (having 3.3% by weight $Na_2O$). As mentioned, the borosilicate glass 3.3 is not chemically pretensionable. Even a $Na_2O$ content of 1 to 3% by weight is adequate for pretensioning. A somewhat higher content (up to 5% by weight) can however be advantageous for improving the melting characteristics.

A compressive stress can build up in the surface of the glasses and this can be attributed to the glass structure caused by the composition and also to the fact that also divalent ions (such as $Ca^{2+}$ and $Zn^{2+}$ which are present in the glass at least to 2 percent by weight) can be exchanged for $K^+$ from the salt bath. Furthermore, the higher transformation range of the glasses facilitates the formation of an increased compressive stress in the surface because of the reduced tendency of the relaxation during the chemical pretensioning process.

The use of glasses of the following composition range (in percent by weight on oxide basis) is preferred: $SiO_2$ 73–78; $B_2O_3$ 9–12; $Na_2O$ 1–5; $K_2O$ 1–<5; $Al_2O_3$ 1–4; CaO 1–3; ZnO 1–2; $ZrO_2$ 0.5–3. This preference is because of the special quality of the glasses with respect to their glass-technical characteristics, the temperature difference stability and the strength after pretensioning.

In a further preferred embodiment of the invention, glass bodies of the above-mentioned composition are used which are produced on a float bath. Apparently, this pretreatment increases the capability of the glass to be chemically pretensioned. It is assumed that an interaction occurs between the protective gas atmosphere (inter alia, forming gas) and the glass and/or between the tin bath and the glass during the float process whereby the exchange with potassium ions is facilitated.

With the use of the glasses of the above-mentioned composition range for generating chemically pretensioned glasses, one obtains glass bodies which have excellent characteristics of alkali-poor borosilicate glasses such as with respect to thermal loading and which incorporate the very good strength characteristics of chemically tempered glasses.

These glasses are for all applications for tempered glasses such as lamp glass, glass for vacuum technology, for chemical equipment construction and for technical equipment, centrifugal glasses in the aircraft industry, cover plates for photocopiers and the like.

These chemically pretensioned borosilicate glass bodies are preferably in the form of glass plates and are especially well suited for the use as fire protection glass (for example, in the accordance with DIN 4102, Part 13). This excellent suitability is because of the high temperature difference stability of these borosilicate glass bodies.

When mechanically destroyed, these glasses do not disintegrate into small crumbs. They do not satisfy the requirements with respect to crumb breakage for a safety glass and are in this area inferior to the corresponding thermally pretensioned glasses.

It is however especially advantageous, when compared to thermally pretensioned glasses, that also non planar glass bodies (especially glass bodies or glass plates) can be pretensioned and maintain their form during this process.

EXAMPLE

The method of the invention will be explained with respect to an exemplary embodiment E thereof and a comparative example C of a borosilicate glass 3.3 which has the above-mentioned composition. In the Table, the glass compositions as well as several relevant characteristics of the glasses before and after pretensioning are presented.

The glass according to the invention exhibits high increases in strength because of a greater ion exchange depth for similar surface concentrations of $K_2O$ in both the comparative example C and the exemplary embodiment E. On the other hand, in the comparison glass, the strength characteristics are not significantly improved. That the comparative example has even a slight improvement of the strength characteristic can be attributed to its production in the float method.

The glasses were melted from the usual raw materials and produced on a conventional float bath. For each example, 50 specimens having dimensions 100 mm×100 mm×3.3 mm were produced from the borosilicate flat glass plates obtained in this manner. The plates were roughened wet using emery paper of 220 grain size and checked after a 24-hour storage. The specimens prepared in this manner were chemically pretensioned in a $KNO_3$ melt ($KNO_3$-content>99%) at a temperature of 480° C. for 8 hours.

The physical investigative methods presented below were applied to determine the characteristics and magnitudes listed in the Table.

The trace of concentration of the ions in the exchange zone were determined utilizing energy-dispersive X-ray analysis (EDX, quantitative line scan). Accordingly, the ion exchange depth and the surface concentration of $K_2O$ were determined.

The bending tensile strength was determined in accordance with DIN 52292 T1 (DIN=German Industrial Standard). The 5% fractile of the Weibull distribution is given as value.

The impact test was carried out in a manner similar to the spring hammer in accordance with EN 60 335 T1 (EN=European Standard). The impact resistance was tested with a drop weight having a mass of 250 g and having a polyamide half sphere (Rockwell hardness R 100 having a radius of 10 mm) at the tip thereof. The test was conducted in that the drop weight was permitted to fall from increasing elevations (performed in increments of 5 cm) onto the sample. The elevation was included in the impact resistance value at which the specimen shattered. Also listed are the 5% fractile from the Weibull distribution.

It is understood that the foregoing description is that of the preferred embodiments of the invention and that various changes and modifications may be made thereto without departing from the spirit and scope of the invention as defined in the appended claims.

TABLE

Composition (in percent by weight on oxide basis) of the glasses (E = Exemplary Embodiment, C = Comparative Example) and their important characteristics.

|  | E | C |
|---|---|---|
| $SiO_2$ | 75.7 | 80.9 |
| $B_2O_3$ | 10.0 | 12.8 |
| $Na_2O$ | 2.9 | 3.3 |
| $K_2O$ | 2.6 | 0.6 |
| $Al_2O_3$ | 2.6 | 2.4 |
| CaO | 2.9 | — |
| $ZrO_2$ | 2.6 | — |
| ZnO | 1.9 | — |
| Transformation point Tg (°C.) | 585 | 530 |
| Thermal Coefficient of Expansion α ($10^{-6}$/K) | 4.0 | 3.3 |
| Ion Exchange depth (μm) | 35–40 | 15–20 |
| Surface concentration of $K_2O$ (weight percent) | 6 | 5 |
| Bending Tensile Strength (5% fractile of Weibull Distribution (N/mm$^2$)): |  |  |
| not pretensioned | 32.9 | 33.6 |
| chemically pretensioned | 67.9 | 35.6 |
| Impact Resistance (5% fractile of Weibull Distribution (Nm)): |  |  |
| not pretensioned | 0.11 | 0.10 |
| chemically pretensioned | 0.27 | 0.12 |

What is claimed is:

1. A method of producing a chemically pretensioned glass body, the method comprising the steps of:

providing a glass body having a composition in percent by weight on oxide basis:

| $SiO_2$ | 70–85 |
|---|---|
| $B_2O_3$ | 8–15 |
| $Na_2O$ | 1–5 |
| $K_2O$ | –<5 |
| $Al_2O_3$ | 1–5 |
| MgO | 0–3 |
| SrO + BaO | 0–2 |
| CaO | 0–3 |
| ZnO | 0–3 |
| with CaO + ZnO | 2–6 |
| $ZrO_2$ | 0–3.5; | placing said glass body in ion exchange salt bath containing at least 90% by weight of potassium salts; and, maintaining said salt bath at a temperature below the transformation point Tg of the glass defined by said glass composition for a duration of at least 2.0 hr causing potassium ions from said salt bath to migrate into the surface region of said glass body to thereby produce said chemically pretensioned glass body.

2. The method of claim 1, wherein said salt bath is maintained at a temperature between 400° C. and 550° C. for a residence time of between 2 and 25 hours.

3. The method of claim 2, wherein said composition is in percent by weight on oxide basis:

| $SiO_2$ | 73–78 |
|---|---|
| $B_2O_3$ | 9–12 |
| $Na_2O$ | 1–5 |
| $K_2O$ | 1–<5 |
| $Al_2O_3$ | 1–4 |
| CaO | 1–3 |
| ZnO | 1–2 |
| $ZrO_2$ | 0.5–3. |

4. The method of claim 1, wherein said glass body is produced on a float bath.

5. The method of claim 1, wherein said composition includes a glass refining agent in an amount corresponding to at least 0.05% by weight on oxide basis.

6. The method of claim 5, wherein said glass refining agent is selected from the group consisting of $Sb_2O_3$, $As_2O_3$ and a halogenide.

* * * * *

UNITED STATES PATENT AND TRADEMARK OFFICE
CERTIFICATE OF CORRECTION

PATENT NO. : 5,876,472
DATED : March 2, 1999
INVENTOR(S) : Oliver Gros, Sabine Melson, Roland Leroux, Otmar Becker and Dietrich Busch It is certified that error appears in the above-identified patent and that said Letters Patent is hereby corrected as shown below:

In column 1, line 40: delete "Schroder et al" and substitute -- Schröder et al -- therefor.

In column 2, line 9: delete "Schroder et al." and substitute -- Schröder et al. -- therefor.

In column 2, line 19: delete "$9.5 \times 10^{31\ 6}\ K^{-1}$" and substitute -- $9.5 \times 10^{-6}\ K^{-1}$ -- therefor.

In column 2, line 62: between "in" and "ion", insert -- an --.

In column 6, line 8: in the table, in the right column, delete "-<5" and substitute -- 1 - <5 -- therefor.

In column 6, line 15: between "in" and "ion", insert -- an --.

Signed and Sealed this

Eighth Day of May, 2001

*Attest:*

NICHOLAS P. GODICI

*Attesting Officer*  *Acting Director of the United States Patent and Trademark Office*